United States Patent
Jokikyyny et al.

(10) Patent No.: US 8,169,966 B2
(45) Date of Patent: May 1, 2012

(54) METHOD AND A NETWORK NODE FOR MANAGING HANDOVERS IN A PACKET DATA COMMUNICATION ENVIRONMENT

(75) Inventors: Tony Jokikyyny, Espoo (FI); Teemu Rinta-Aho, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 858 days.

(21) Appl. No.: 11/915,915

(22) PCT Filed: Jun. 1, 2005

(86) PCT No.: PCT/SE2005/000836
§ 371 (c)(1),
(2), (4) Date: Nov. 29, 2007

(87) PCT Pub. No.: WO2006/130058
PCT Pub. Date: Dec. 7, 2006

(65) Prior Publication Data
US 2009/0303962 A1 Dec. 10, 2009

(51) Int. Cl.
*H04W 4/00* (2009.01)
*H04W 36/00* (2009.01)
(52) U.S. Cl. .......................... 370/331; 455/438; 455/439
(58) Field of Classification Search .................. None
See application file for complete search history.

(56) References Cited

U.S. PATENT DOCUMENTS

| 6,859,654 B1* | 2/2005 | Reynolds et al. | 455/437 |
| 7,218,634 B1* | 5/2007 | Khalil et al. | 370/392 |
| 2004/0136348 A1* | 7/2004 | Han | 370/338 |
| 2004/0203787 A1* | 10/2004 | Naghian | 455/437 |
| 2005/0047372 A1 | 3/2005 | Yano et al. | |
| 2005/0073990 A1* | 4/2005 | Chang et al. | 370/349 |

FOREIGN PATENT DOCUMENTS

| JP | 2001-258058 A | 9/2001 |
| JP | 2002-135823 A | 5/2002 |
| JP | 2002-191066 A | 7/2002 |
| JP | 2005-109921 A | 4/2005 |

OTHER PUBLICATIONS

Njedjou et al., "Motivation for Network Controlled Handoffs using IP mobility between heterogeneous Wireless Access Networks", Jun. 2003.*

* cited by examiner

*Primary Examiner* — John Blanton

(57) ABSTRACT

The invention deals with managing handovers between access networks in a packet data communication environment. According to the invention, the possibility to control access network resources will improve by having a mobility manager node (160) managing such handovers. The mobility manager node will decide to handover a mobile node (105) from a first access network (110) to a second access network (120) based on received information relevant to the handover process. After the decision, the mobility manager node will instruct a home agent (141) or similar node to register a new care-of address or other locator of the mobile node's point of attachment, which is valid in the second access network and which can be used for contacting the mobile node in the second access network. The mobility manager node will thereafter instruct the mobile node to de-attach from the first network and attach to the second network. The invention will be especially advantageous for mobile operators managing a communication environment with heterogeneous networks, such as WLAN and WCDMA networks.

21 Claims, 4 Drawing Sheets

METHOD AND A NETWORK NODE FOR MANAGING HANDOVERS IN A PACKET DATA COMMUNICATION ENVIRONMENT

FIELD OF THE INVENTION

The present invention relates to methods and network nodes for managing handovers in a communication environment, and more particularly it relates to methods and network nodes for managing handovers between access networks in a packet data communication environment comprising heterogeneous access networks.

BACKGROUND OF THE INVENTION

Today's communication environments may comprise a plurality of access networks having different communication capabilities and covering different geographical areas. For example, a communication environment may comprise a Wireless Local Area Network (WLAN) and a W-CDMA network, wherein the W-CDMA network may have different communication capabilities than the WLAN network. Also, the access networks may partly overlap each other or one access network may as a whole overlap the other access network. In such a communication environment, there may be occasions when a network connection of a mobile communication node, such as a laptop computer having communication means, needs to be moved from one access network to another access network, i.e. when the network connection needs to be handed over from e.g. the W-CDMA network to the W-LAN network or from one W-CDMA network to another W-CDMA network. This may be necessary because e.g. the mobile node has moved geographically such that the access network with which it originally communicated experiences bad communication capabilities, e.g. bad radio coverage. Another reason may be that the user of the mobile node has changed its way of communicating such that it needs another quality of service, which is better taken care of by another access network. Such a handover between access networks is called network layer handover.

Mobile IPv6 and Mobile IPv4 are prior art network layer mobility management protocols enabling such mobility in IPv6 and IPv4 based networks, respectively. Mobile IPv6 is described e.g. in the document "Mobility support in IPv6" by Johnson et al, RFC3775, published on the Internet by the Network Working Group of the IETF in June 2004. This document specifies a protocol which allows mobile communication nodes to remain reachable while moving around in the IPv6 Internet. Each mobile node is always identifiable by a home address, i.e. a static IP address of the mobile node valid at the mobile node's home network, regardless of the mobile node's current point of attachment to the Internet. When situated away from its home network, i.e. when connected to the Internet via a foreign access network, the mobile node is also associated with a care-of address, which provides information about the mobile node's current location. A care-of address is a temporary IP address of the mobile node valid at the foreign access network that the mobile node visits. The care-of address is registered in a binding update list in a home agent in the home network as an association with the mobile node's home address. A "binding" means an association of the home address with a care-of address, and a home agent is a router located at the mobile node's home network that is used by the mobile node for registering its care-of address. Thereby, IPv6 data packets addressed to the mobile node's home address can be transparently routed to the mobile node's care-of address.

For a mobile node in a Mobile IPv6 based system to perform a handover from one access network to another access network, the mobile node collects information relevant for making a handover decision from the available access networks, such as radio link quality measures of the radio links between the mobile node and access points in the available access networks. The mobile node evaluates the information relevant for making a handover decision, and makes a decision to handover the connection to another access point in another access network, e.g. when the current radio link quality goes below a certain threshold and a radio link quality of an access point in another network is above a certain threshold. Then the mobile node will configure a new care-of address valid in the new access network. The new care-of address may be communicated to the mobile node from the new access network. Thereafter, the mobile node performs the handover by:

sending a Binding Update message to the home agent, instructing the home agent to associate the home address with a new care-of address, and receiving a binding acknowledgement message from the home agent, after it has successfully received and processed the binding update message.

The Mobile IPv6 also enables correspondent nodes, i.e. other communication nodes, such as computers, that are communicating with the mobile node, to send packets destined for the mobile node directly to its care-of address. If this routing optimisation opportunity is used, the mobile node will also send Binding Update messages directly to the correspondent nodes, including the mobile node's care-of address associated with the mobile node's home address.

The mobile IPv4 protocol is described e.g. in. "IP Mobility Support for IPv4" by Perkins et al, RFC3344, published on the Internet by the Network Working Group of the IETF in August 2002. The process for achieving mobility in an IPv4 based system is similar to the process for an IPv6 based system.

The Host Identity Protocol (HIP) is another network layer mobility management protocol for achieving mobility between access networks in an IP based communication environment. HIP is described e.g. in "End-Host Mobility and Multi-Homing with the Host Identity Protocol", draft-ietf-hip-mm-01, by Nikander et al, published by the IETF in Feb. 20, 2005 as an Internet draft, which is a working document. The HIP defines a mechanism that decouples the transport layer (TCP, UDP, etc) from the internetworking layer (IPv4 and IPv6). When a host (which is similar to a mobile node) uses HIP, the overlying protocol sublayers are not bound to IP addresses but instead to Host Identifiers. A host, or mobile node, is identified by its Host Identifier and located by its IP address, i.e. when moving to a new network it gets a new temporary IP address but keeps its Host Identifier. Thereby, HIP also makes it possible to make handovers between IPv4 and IPv6 addresses, i.e. between an IPv4 based network and an IPv6 based network. In HIP a "rendezvous" server is described which corresponds to the Home Agent in Mobile IP.

In solutions based on network layer mobility management protocols, such as the above described Mobile IPv4, Mobile IPv6 and HIP, all control of the handovers lie within the mobile node. Although, network operators having many different access networks in their communication system would like to easily control the mobility between access networks, i.e. the network layer handovers, e.g. in order to balance the load within their access networks. This is not possible in the prior art solutions described above. To be able to control the mobility of mobile nodes between access networks by the network operators is especially interesting in modern IP networks where many communication nodes will be mobile and have multiple access network interfaces, e.g. both W-CDMA and WLAN interfaces, whereby the mobile nodes can dynamically and individually attach to different access networks based on need of the current application and/or service. Therefore, there exists a need for a solution where the network layer handovers are controlled in a communication network, e.g. by a network operator.

In the document "Motivation for network controlled handoffs using IP mobility between heterogeneous Wireless Access Networks" by Njedjou et al, published by the IETF in June 2003 as an Internet draft, which is a working document and which validity has now expired, the desirability of a network controlled handover process is discussed. In this document a new function in the home network is introduced called a Mobility Manager that gathers information from the involved access networks, transfers the information to the mobile node such that the mobile node takes handover decisions which are based on the information received from the mobility manager, as well as on information of radio link characteristics and the need of the current application and/or service.

In this prior art solution the mobility management decisions, i.e. the handover decisions are made within the mobile nodes. This would require a lot of processing in the mobile nodes. Further, a lot of signalling is required to receive information from the access networks and to send information to the mobile nodes. Further, all this processing and signalling over a radio interface need to be secured somehow causing even more processing needs. Also, since the handover decisions are still made within the mobile nodes, the access networks, and the network operator of access networks in a communication environment will not have a full control of the usage of its access network resources. The network operators can supply a mobile node with information that would advice the mobile node to e.g. handover to a certain access network, but since the handover decisions are still made in the mobile device the network operators cannot force the mobile node to do such a handover. Therefore, there still exists a need for a solution that improves the possibility to control access network resources from a communication network in a communication environment comprising a plurality of access networks.

SUMMARY OF THE INVENTION

An object of the present invention is to provide a solution that improves the possibility to control access network resources from a communication network in a communication environment comprising a plurality of access networks. Especially, an object of the present invention is to provide a solution in a packet data communication environment for managing a handover of a network connection of a mobile node from an access point in a first access network to an access point in a second access network.

The above objects are achieved by a method, a network node and a computer program product set forth in the characterizing part of the independent claims.

The above objects are achieved, according to a first aspect of the invention, by a method in a packet data communication environment for managing a handover of a network connection of a mobile node belonging to a home network from an access point in a first access network to an access point in a second access network, wherein a network node in the packet data communication environment has access to information relevant for making a handover decision. The method is performed by the network node and the method comprises the steps of:

Deciding to handover the network connection of the mobile node from the access point in the first access network to the access point in the second access network based on the information relevant for making a handover decision;

Instructing a node in the mobile node's home network to register a new locator of the mobile node's point of attachment in the second access network and to associate the new locator with a home address of the mobile node; and Instructing the mobile node to de-attach from the first access network and to attach to the access point in the second access network.

The above objects are achieved, according to a second aspect of the invention, by a network node in a packet data communication environment adapted for managing a handover of a network connection of a mobile node belonging to a home network from an access point in a first access network to an access point in a second access network, wherein the network node has access to information relevant for making a handover decision. The network node comprises:

Means for deciding to handover the network connection of the mobile node from the access point in the first access network to the access point in the second access network based on the information relevant for making a handover decision;

Means for instructing a node in the mobile node's home network to register a new locator of the mobile node's point of attachment in the second access network and to associate the new locator with a home address of the mobile node; and Means for instructing the mobile node to de-attach from the first access network and to attach to the access point in the second access network.

An advantage of the present invention is that it makes it possible for network operators to easily control the mobility of terminals between access networks. This would be especially advantageous in a communication environment comprising access networks belonging to one operator.

A further advantage of an embodiment of the invention is that it can be integrated with other existing solutions improving handover performance between access networks in a communication environment.

A still further advantage of the invention is that it reduces signalling over the radio interface compared to prior art solutions.

Another advantage of the invention is that it is easy to implement in a communication environment using any mobility management protocol, such as Mobile IPv6, Mobile IPv4 or HIP, because it only needs minor additions to the current specifications.

Yet another advantage of the invention is that it reduces processing requirements at the mobile node.

BRIEF DESCRIPTION OF THE DRAWINGS

The invention will in the following be described in more detail with reference to enclosed drawings, wherein.

DETAILED DESCRIPTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
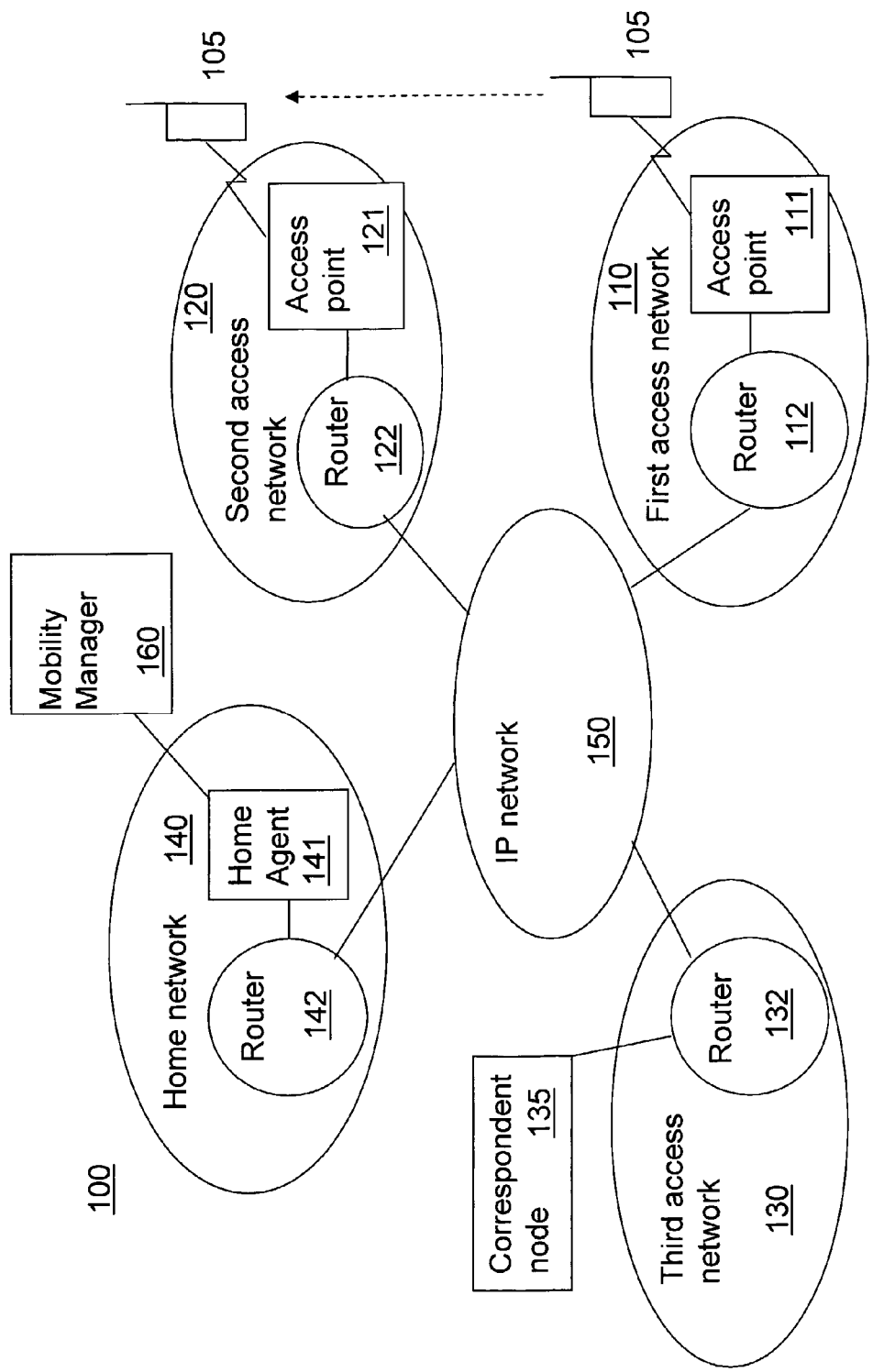
FIG. 1 describes a schematic block diagram of a communication environment wherein the present invention may be used.

FIG. 1 shows a schematic block diagram of an exemplary packet data communication environment 100 based on Mobile IP wherein the present invention can be used. The mobile node 105, which could be any communication device communicating packet data, such as a laptop or a mobile phone, belongs to a home network 140, which has a home agent 141 and a router 142. The mobile node 105 has a stable home address belonging to the address space of the home network. FIG. 1 also shows a first access network 110 with at least one access point 111 and a router 112, and a second access network 120 with at least one access point 121 and a router 122, and a third access network 130 with a router 132 (and possibly at least one access point). The communication environment also comprises a mobility manager 160 according to the invention. In the figure the mobility manager is connected to the home agent 141. Although, the mobility manager may be connected in any way to the communication environment as long as it can communicate with the involved access networks and home networks. All networks are connected via one or more networks, such as an IP network 150, for example the Internet.

In a scenario of the invention, the mobile node 105 has a connection to the first access network 110 via the access point 111, and is communicating with a correspondent node 135, which according to FIG. 1 is connected to the third access network 130, but which may be connected to any network. The correspondent node may be any communication node that the mobile node communicates with, such as another mobile node or a stationary node e.g. a stationary computer, or a server. In this scenario, the mobile node 105 has received a care-of address in the first access network, which care-of address is registered in the home network's home agent 141 and associated with the mobile node's home address in a binding update list such that a communication node, e.g. the correspondent node 135 can communicate with the mobile node 105 using the mobile node's home address.

According to the invention, the mobility manager 160 manages a network layer handover, i.e. a handover of the connection from the first access network to the second access network or any handover requiring a change in IP address, or other locator of the mobile node's point of attachment, of the connection. (The handover is shown as a dotted arrow in FIG. 1, wherein the mobile node moves from the first access network to the second access network). The handover may be made due to e.g. that the mobile node has moved out of coverage of the first access network and into coverage of the second access network, that the first access network is too heavy loaded or that the mobile node has changed its way of communicating such that its quality of service requirements have changed such that the mobile node would be better served in the second access network.

For being able to manage the handover of the connection, the mobility manager has access to information relevant for making a handover decision regarding the mobile node. This handover decision relevant information may be repeatedly received at the mobility manager from the access networks that are within radio communication distance of the mobile node. Thereafter, the mobility manager decides to handover the connection from the first access network 110 to the second access network 120, or more exactly from the access point 111 in the first access network to the access point 121 in the second access network, based on the handover decision relevant information. In the following step, the mobility manager instructs the home agent 141 to register a new care-of address for the mobile node in the second access network 120 and to associate the new care-of address to the mobile node's home address in a Binding update list stored in the home agent. The new care-of address has preferably been communicated from the second access network to the mobility manager prior to this step. The mobility manager also instructs the mobile node to de-attach from the first access network and to attach to the access point 121 in the second access network. The instruction to the mobile node may according to an embodiment of the invention be sent via the home agent and transmitted from the home agent to the mobile node in a binding acknowledgement message. The instruction may comprise an address of the access point 121 in the second access network. An address of the access point should in this application be interpreted as any information that would make it possible for the mobile node to identify and localize the access point.

According to another embodiment of the invention, the process would also comprise the step of informing correspondent nodes 135, i.e. communication nodes that the mobile node is communicating with, about the mobile node's new care-of address. Thereby, it would be possible for a correspondent node to directly contact the mobile node by using the mobile node's care-of address and not its home address, such that this embodiment of the invention also can use route optimisation mechanisms, such as route optimisation mechanisms provided by Mobile IP v6. If the mobility manager is to inform the correspondent nodes about the mobile node's new care-of address, it needs to be aware of the correspondent nodes. This may be accomplished by, e.g. sending a message from the mobile node to the mobility manager comprising an Identity of the mobile node, e.g. its home address, and a list of correspondent node addresses that are to be informed of the current care-of address or locator. This means that for each of these correspondent nodes, the mobility manager needs to inform the correspondent nodes every time the mobile node changes it's care-of address or locator. The information to the correspondent nodes may be sent in a binding update message or similar message.

The handover decision relevant information that the mobility manager 160 has access to may for example be any of the following:

Link quality information of a link between an access point and the mobile node, such as radio link quality information of a radio link between an access point that is within radio communication distance of the mobile node and the mobile node;

An address of an access point that is within communication distance of the mobile node;

Service ability of an access network that is within communication distance of the mobile node, including load information of the access network;

Quality of service requirements of the mobile node;

Quality of service requirements for a data flow from or to the mobile node;
Physical location of an access network,
Subscription details of the mobile node, and
Current physical location of the mobile node.

In FIG. 1 an example is shown where the mobile node changes its point of attachment from the first access network 110 to the second access network 120. Although it should be understood that the invention is applicable for a mobile node changing point of attachment from any access network or subnetwork to another access network or subnetwork, which change requires a change of an IP address/other locator. I.e. to make a handover from a first access network to a second access network should be interpreted as any network layer handover, i.e. wherein the mobile node changes its point of attachment from one access network or subnetwork to another access network or subnetwork.

Although FIG. 1 describes a packet data communication environment based on mobile IP, the inventive idea may be generalized to any communication environment with packet data communication, in which handovers may take place between access networks. The packet data communication environment may for example use HIP or any other network layer mobility management protocol. For example may the home agent 141 be any node in the home network that keeps control of the mobile node and where it is situated, such as a rendezvous server in HIP. Also, the term care-of address used in Mobile IP is one example of a locator of the mobile node's point of attachment in the second network, which locator is used to contact the mobile node at the access network the mobile node visits, such as a Host Identifier used in HIP.

By using this invention, network operators can easily control the mobility of mobile nodes between access networks. The network operators are able, via the mobility manager, to access all information from the access networks relevant for making a handover decision and to use it when making a handover decision.

The invention reduces signalling over the radio interface compared to the prior art solution described in the document "Motivation for network controlled handoffs using IP mobility between heterogeneous Wireless Access Networks" cited above, as no triggering messages are needed between the mobile node and the mobility manager. Further, the mobility manager can process and send all mobility management signalling messages. This way the only mandatory message between the network and the terminal in the handover process is the message to the mobile node notifying about the new access point in the second access network and the address of that new access point. According to an embodiment of the invention, if the mobile node has multiple network interfaces and a capability to use several of them simultaneously, such that the mobile node can have several different network connections simultaneously over which different data flows are flowing, this message can also contain a flow ID indicating which of the data flows of the mobile node that will be handed over.

Figure 2:
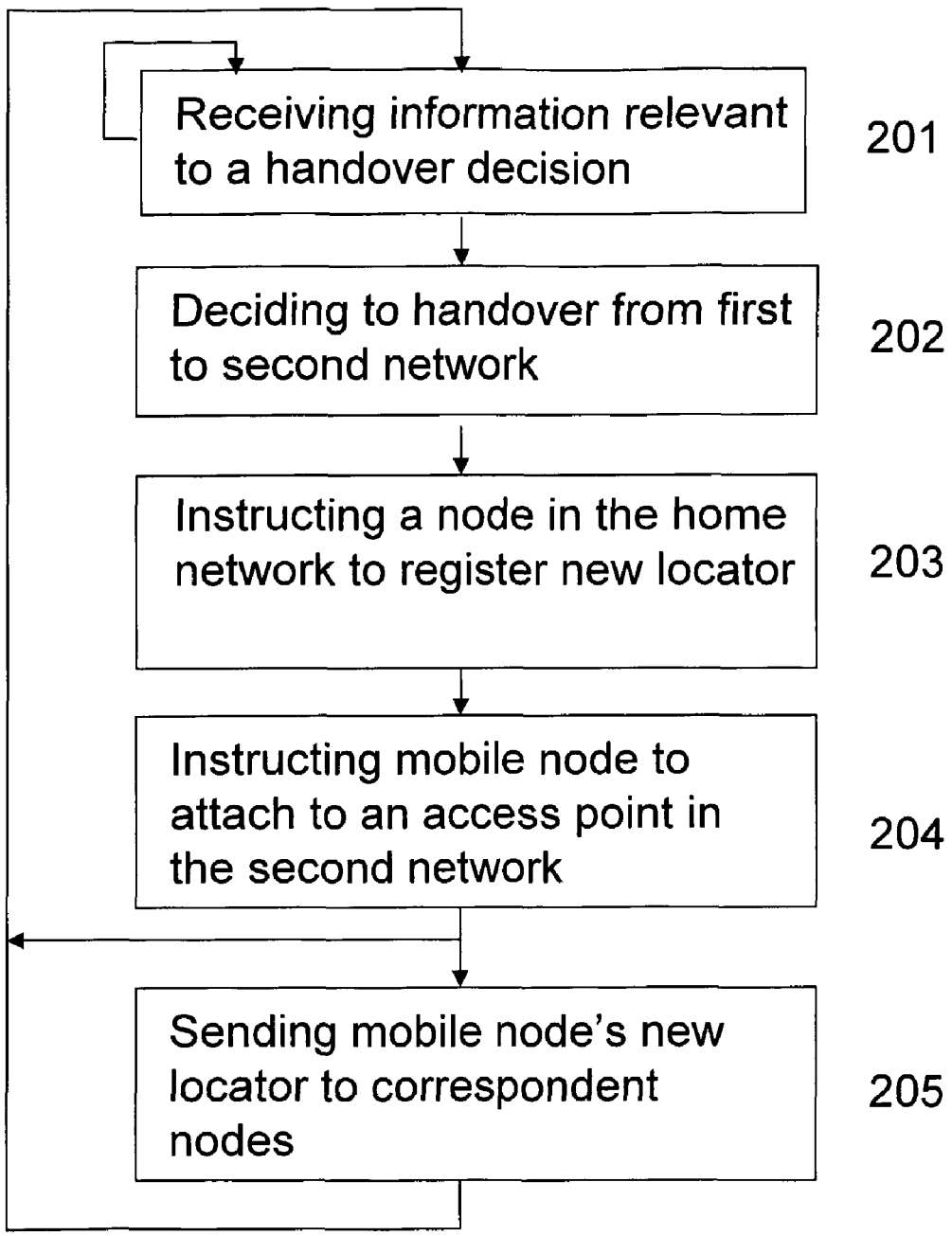
FIG. 2 shows a flow chart of a method of the invention.

FIG. 2 describes a process according to an embodiment of the invention for managing a handover of a network connection in a packet data communication environment. The process starts with the mobility manager receiving 201 information relevant for making a handover decision, such as information on candidate access networks, i.e. access networks that may be able to serve the mobile node, and on the mobile node. The information is collected and stored in the mobility manager, or in some other location where it is available in real-time. The mobility manager would repeatedly receive information, e.g. periodically or triggered by an event. By this step, the mobility manager will be able to know which access networks that can hear the mobile node at any point in time. Based on the information, the mobility manager can decide whether a handover to another access network should take place or not.

Once the mobility manager has decided 202 to handover the connection of the mobile node from a first access network to a second access network, the mobility manager will start a handover procedure according to the invention. In a first phase of the handover procedure, the mobility manager instructs 203 a node in the home network, e.g. a home agent or a rendezvous server, to register a new locator of the mobile node's point of attachment in the second network, e.g. a care-of address of the mobile node in the second network. The node in the home network can register the new locator by, according to one embodiment, updating a binding of the mobile node in a binding update list, or similar, in the node in the home network. The binding between the mobile node's home address and old locator would then be changed to a binding between the home address and the new locator, which has been assigned for the mobile node in the new access network, and communicated from the new access network to the mobility manager. Right after the first phase, or alternatively in parallel, a second phase is executed. In the second phase, the mobility manager, the Home Agent/Rendezvous server or similar node through delegation, instructs 204 the mobile node to de-attach from the old access point in the first (old) access network and to attach to an access point in the second (new) access network. This is done by e.g. sending an address of the new access point to the mobile node, in e.g. a binding acknowledgement message. The mobile node then performs the handover according to a standard mobility management protocol, except that the mobile node does not send any binding update messages or similar messages, depending on the mobility management protocol. Instead, the mobile node only attaches its network interface to the right access point and configures its new locator for this interface. During the handover, bi-casting, i.e. a kind of soft handover used for network layer handovers, and other optional mechanisms may be used to smoothen the handover. The third and last phase of the handover procedure is optional. In this phase, the mobility manager sends 205 binding update messages, or similar messages, including the mobile node's new locator to the correspondent nodes with whom the mobile node is communicating. Thereby, an optional route optimisation mechanism can be used, such that the correspondent node can contact the mobile node directly by using its new locator.

Figure 3:
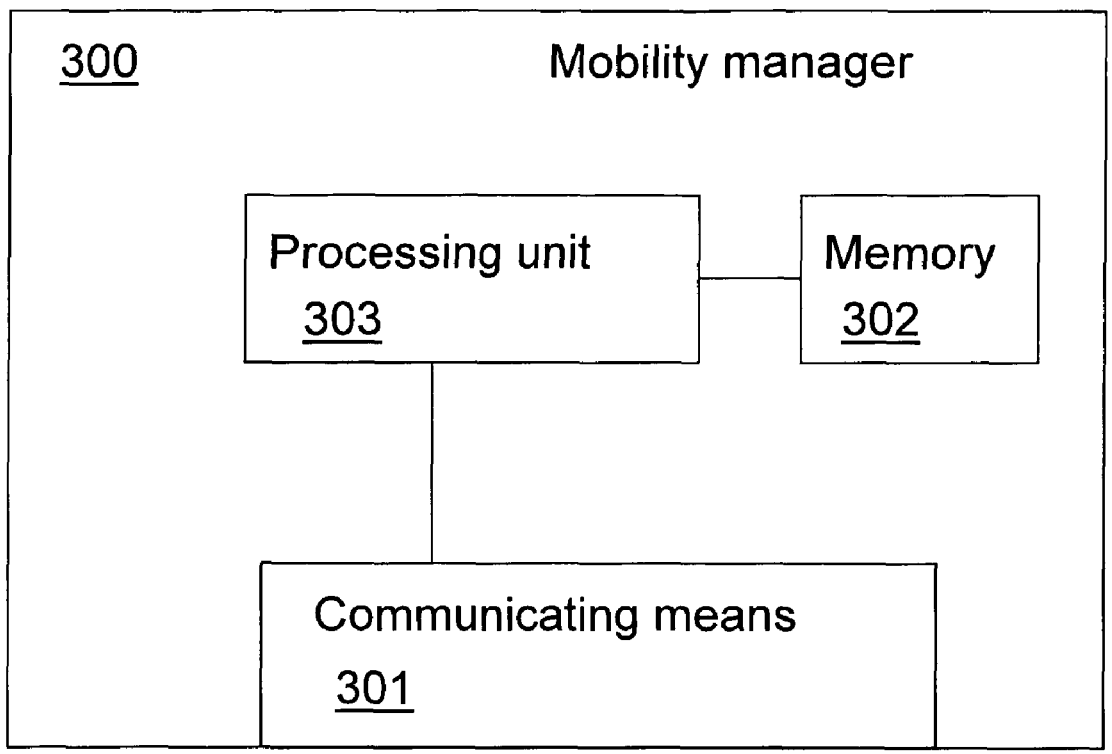
FIG. 3 shows a schematic block diagram of a mobility manager node according to the invention.

A mobility manager according to an embodiment of the invention is described in FIG. 3. The mobility manager 300 may for example be a separate node situated anywhere in the packet data communication environment, e.g. in a core network or in a service network of an operator controlling the first and the second access networks, or it may be an apparatus or a logical service integrated in an existing node in the communication environment, advantageously integrated in the mobile node's home network, e.g. in the home agent in a Mobile IPv6 based system. Also, the mobility manager has network connectivity via a communication means 301 to all potential access networks that the mobile node might visit. Further, the mobility manager is adapted for managing a handover of a mobile node's network connection from an access point in a first access network to an access point in a second access network. For this reason, the mobile node has access to information relevant for making a handover decision. This information may be stored e.g. in a memory 302 in the mobility manager. The mobility manager also has a processing unit 303 for managing a handover of a network connection. In the processing unit 303 there are:

Means for deciding to handover a mobile node's network connection based on the information relevant for making a handover decision;

Means for instructing, via the communication means 301, a node in the mobile node's home network to register a new locator of the mobile node's point of attachment in the second access network and to associate the new locator with a home address of the mobile node;

Means for instructing, via the communication means 301, the mobile node to de-attach from the first access network and to attach to the access point in the second access network; and, optionally, Means for informing, via the communication means 301, correspondent nodes that are communicating with the mobile node about the mobile node's new locator.

Figure 4:
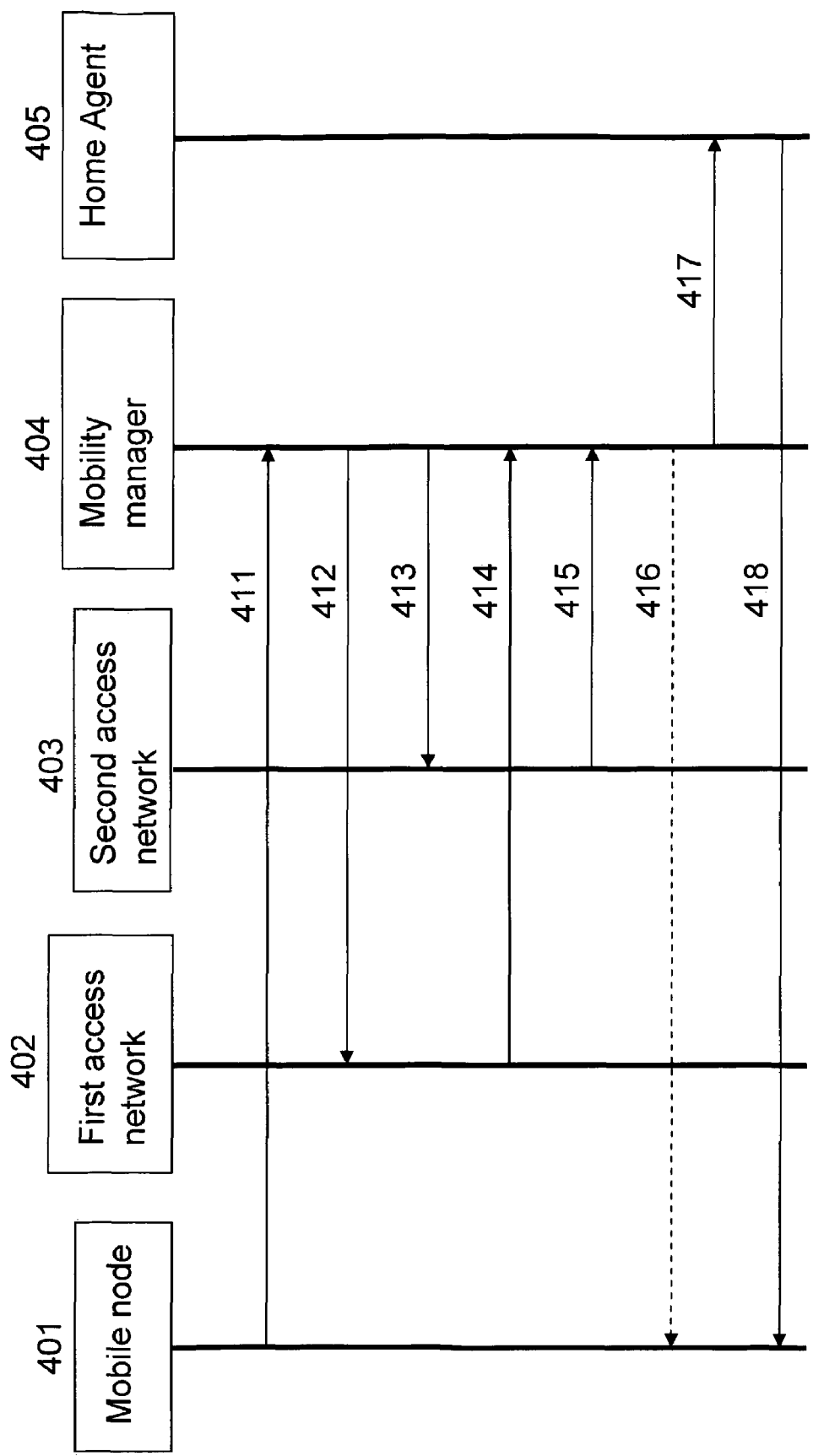
FIG. 4 shows a signalling flow diagram of an information collection process according to an embodiment of the invention.

To exchange information in the method according to the invention, the following protocol as described in FIG. 4 can be deployed between the mobile node 401, the mobility manager 404, the involved access networks 402, 403 and the home agent 405. FIG. 4 shows the embodiment where the mobility manager is a separate node from the home agent. In the embodiment of FIG. 4, the handover procedure is triggered by the mobile node sending a request for assistance. If the mobile node 401 starts to loose radio coverage to one access network it may send a request for assistance 411 to the mobility manager comprising e.g. addresses of the access networks (i.e. access points in the access networks) that are within radio coverage of the mobile node and of the radio link qualities. Although, the request for assistance message is only optional. The mobility manager could trigger the handover procedure itself, by e.g. sending a request for information message 412, 413. The mobile node only has to register with the mobility manager when switching on/powering up the mobile node. The Mobility Manager could then track the movement of the Mobile Node by receiving information from the Access Network(s). Then the mobility manager would send a request for information message 412, 413 to the access networks within radio access of the mobile node requesting information about the access networks relevant to the handover process, e.g. the load of the access networks, and possibly an update of the radio link quality measurements of the radio links to the mobile node. Access network information is sent from the access networks to the mobility manager in access network information messages 414, 415. Thereafter, the mobility manager may optionally send a message 416 informing the mobile node that a handover is going to happen, such that the mobile node can prepare itself for the handover.

Then the mobility manager makes a handover decision based on the information it has received, and the handover procedure will start by the mobility manager sending instructions 417 to the home agent, instructing the home agent to register a new locator of the mobile node's point of attachment in the new access network. The mobility manager would also instruct the home agent to instruct the mobile node, e.g. in a binding acknowledgement message 418, to handover to an access point in the new access network. Alternatively, the mobility manager may instruct the mobile node directly to handover to an access point in the new access network.

In another embodiment of the information collection process, the mobility manager may receive handover relevant information without first sending a request for information, and/or without being triggered by a request for assistance from the mobile node. In this case, the handover relevant information may be sent to the mobility manager e.g. periodically or triggered by events happening in the communication environment, such as if the radio link quality of all radio links from access points in one access network to the mobile node are below a certain threshold or if there is overload in a network component. The mobility manager may also send an initial request for information to an access network with instructions to e.g. send handover relevant information regarding a mobile node with a certain periodicity or triggered by certain events, as described above.

The handover relevant information can be cached in e.g. the mobility manager so that it can be reused for other mobile nodes in the packet data communication environment.

As mentioned above, the mobile node may have more than one network interface, such that it can change from communicating over a first network to communicating over a second network that uses a different technology than the first network, e.g. from communicating over a W-CDMA network via its W-CDMA network interface to communicating over a WLAN network over its WLAN interface. For such handovers, in the case when the mobile node can only use one network interface at a time, all traffic has to be moved from a first network interface to a second network interface in the mobile node. The invention would also be applicable to handovers between heterogeneous networks that requires such change of network interface in the mobile node.

The inventive idea is especially advantageous to apply for a packet data communication environment belonging to one operator, which environment has different access networks, wherein at least some of the access networks are based on different access technologies.

Although, the inventive idea might as well be used for a packet data communication environment which comprises access networks belonging to different operators. In this case it can be applied for roaming (i.e. when a mobile node moves from one operator's network to another operator's network.)

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method in a packet data communication environment for managing a handover of a network connection of a mobile node belonging to a home network from an access point in a first access network to an access point in a second access network, characterized in that a network node in the packet data communication environment has access to information relevant for making a handover decision, the method being performed by the network node and the method comprising the steps of:

deciding to handover the network connection of the mobile node from the access point in the first access network to the access point in the second access network based on the information relevant for making a handover decision;

instructing a node in the mobile node's home network to register a new locator of the mobile node's point of attachment in the second access network and to associate the new locator with a home address of the mobile node;

instructing the mobile node to de-attach from the first access network and to attach to the access point in the second access network, wherein the step of instructing the mobile node to de-attach from the first access network and to attach to the access point in the second access network comprises sending a message to the node in the mobile node's home network with instructions to the mobile node, which instructions are forwarded from the node in the mobile node's home network to the mobile node.

2. The method according to claim 1, wherein the network node has access to information relevant for making a handover decision by repeatedly receiving information of access networks that are within radio communication distance of the mobile node and information of the mobile node.

3. The method according to claim 1, wherein the information relevant for making a handover decision comprises any of the following information:
   link quality information of a link between an access point and the mobile node;
   addresses of access points that are within communication distance of the mobile node;
   service ability of access networks that are within communication distance of the mobile node, including load information of the access networks;
   quality of service requirements of the mobile node;
   quality of service requirements for a data flow from or to the mobile node; physical location of an access network;
   current physical location of the mobile node, and subscription details of the mobile node.

4. The method according to claim 1, wherein the network node gets access to information relevant for making a handover decision according to the following procedure performed by the network node:
   sending a request for information message to the first and the second access networks; and
   receiving information relevant for making a handover decision from the first and the second access networks.

5. The method according to claim 1, wherein the packet data communication environment is based on mobile IP and wherein the step of instructing a node in the mobile node's home network comprises instructing a home agent in the mobile node's home network to update a binding update list in the home agent from an old binding between an old care-of address of the mobile node in the first access network and the home address of the mobile node to a new binding between a new care-of address of the mobile node in the second access network and the home address of the mobile node.

6. The method according to claim 1, wherein the step of instructing the mobile node to de-attach from the first access network and to attach to the second access network involves transmitting a Binding Acknowledgement message to the mobile node instructing the mobile node to de-attach from the first access network and to attach to the second access network.

7. The method according to claim 1, wherein the method also comprises the step of:
   Informing a correspondent node that is communicating with the mobile node about the mobile node's new locator.

8. The method according to claim 1, wherein the step of instructing the mobile node to de-attach from the first access network and to attach to the access point in the second access network also comprises sending a flow identification to the mobile node identifying which of the mobile node's data flows that will be handed over.

9. The method according to claim 1, wherein the step of instructing the mobile node to de-attach from the first access network and to attach to the access point in the second access network also comprises sending to the mobile node an address to the access point in the second access network.

10. A network node in a packet data communication environment adapted for managing a handover of a network connection of a mobile node belonging to a home network from an access point in a first access network to an access point in a second access network, characterized in that the network node has access to information relevant for making a handover decision, wherein the network node comprises:
   means for deciding to handover the network connection of the mobile node from the access point in the first access network to the access point in the second access network based on the information relevant for making a handover decision;
   means for instructing a node in the mobile node's home network to register a new locator of the mobile node's point of attachment in the second access network and to associate the new locator with a home address of the mobile node;
   means for instructing the mobile node to de-attach from the first access network and to attach to the access point in the second access network; and
   wherein the means for instructing a node in the mobile node's home network is arranged for sending a message to the node in the mobile node's home network with instructions to the mobile node, which instructions are to be forwarded from the node in the mobile node's home network to the mobile node.

11. The network node according to claim 10, further comprising:
   means for receiving information relevant for making a handover decision arranged for repeatedly receiving information of access networks that are within radio communication distance of the mobile node and information of the mobile node.

12. The network node according to claim 10, wherein the information relevant for making a handover decision comprises any of the following information:
   link quality information of a link between an access point and the mobile node;
   addresses of access points that are within communication distance of the mobile node;
   service ability of access networks that are within communication distance of the mobile node, including load information of the access networks;
   quality of service requirements of the mobile node;
   quality of service requirements for a data flow from or to the mobile node;
   physical location of an access network;
   current physical location of the mobile node, and subscription details of the mobile node.

13. The network node according to claim 10, wherein the network node is arranged to get access to information relevant for making a handover decision by further comprising:
   means for sending a request for information message to the first and the second access networks; and
   means for receiving information relevant for making a handover decision from the first and the second access networks.

14. The network node according to claim 10, wherein the network node is located in the home network of the mobile node.

15. The network node according to claim 10, wherein the network node is a mobility management node located in a core network or a service network of an operator controlling the first and the second access networks.

16. The network node according to claim 10, wherein the packet data communication environment is based on mobile IP and wherein the means for instructing a node in the mobile node's home network is arranged for instructing a home agent in the mobile node's home network to update a binding update list in the home agent from an old binding between an old care-of address of the mobile node in the first access network and the home address of the mobile node to a new binding between a new care-of address of the mobile node in the second access network and the home address of the mobile node.

17. The network node according to claim 10, wherein the means for instructing the mobile node to de-attach from the first access network and to attach to the access point in the second access network is arranged for transmitting a binding acknowledgement message to the mobile node instructing the mobile node to de-attach from the first access network and to attach to the second access network.

18. The network node according to claim 10, wherein the network node also comprises:
  means for informing a correspondent node that is communicating with the mobile node about the mobile node's new care-of address.

19. The network node according to claim 10, wherein the means for instructing the mobile node to de-attach from the first access network and to attach to the access point in the second access network is further arranged for sending a flow identification to the mobile node identifying which of the mobile node's data flows that will be handed over.

20. The network node according to claim 10, wherein the means for instructing the mobile node to de-attach from the first access network and to attach to the access point in the second access network is further arranged for sending to the mobile node an address to the access point in the second access network.

21. A tangible non-transitory computer-readable medium loadable into a memory of a digital computer device residing in the network node, wherein the tangible non-transitory computer-readable medium comprises software code portions for performing the method according to claim 1 when the tangible non-transitory computer-readable medium is run on the computer device.

* * * * *

UNITED STATES PATENT AND TRADEMARK OFFICE
CERTIFICATE OF CORRECTION

| | | |
|---|---|---|
| PATENT NO. | : 8,169,966 B2 | Page 1 of 1 |
| APPLICATION NO. | : 11/915915 | |
| DATED | : May 1, 2012 | |
| INVENTOR(S) | : Jokikyyny et al. | |

It is certified that error appears in the above-identified patent and that said Letters Patent is hereby corrected as shown below:

In Column 1, Line 31, delete "W-LAN" and insert -- WLAN --, therefor.

In Column 2, Line 32, delete "in." and insert -- in --, therefor.

In Column 11, Line 51, in Claim 7, delete "Informing" and insert -- informing --, therefor.

Signed and Sealed this
Eleventh Day of September, 2012

David J. Kappos
*Director of the United States Patent and Trademark Office*